United States Patent [19]

Neitzke

[11] Patent Number: 5,057,257
[45] Date of Patent: Oct. 15, 1991

[54] METHOD OF TRANSFER MOLDING FIBER-REINFORCED RESIN BOLT PRODUCTS

[75] Inventor: Mark K. Neitzke, Bay City, Mich.

[73] Assignee: Quantum Composites, Inc., Midland, Mich.

[21] Appl. No.: 481,128

[22] Filed: Feb. 20, 1990

[51] Int. Cl.⁵ .................. B29C 43/18; B29C 43/20
[52] U.S. Cl. ............................ 264/138; 156/172; 264/258; 411/901
[58] Field of Search .......... 10/1 A, 1 B, 1 R, 11 R, 10/11 T, 27 R; 264/257, 258, 102, 255, 138; 156/180, 184, 187, 169, 172; 411/901

[56] References Cited

U.S. PATENT DOCUMENTS

| | | | |
|---|---|---|---|
| 243,934 | 7/1881 | Mayall | 264/263 |
| 2,949,054 | 8/1960 | White | 264/137 |
| 2,989,784 | 6/1961 | Aamodt | 264/263 |
| 3,884,814 | 5/1975 | Vogt et al. | 264/263 X |
| 4,317,407 | 3/1982 | Blackwell | 264/275 |
| 4,344,806 | 8/1982 | Kramer | 156/187 X |
| 4,414,011 | 11/1983 | Layden et al. | 264/109 X |
| 4,659,071 | 4/1987 | Woltron | 156/169 |
| 4,687,394 | 8/1987 | Berecz | 411/901 |
| 4,687,395 | 8/1987 | Berecz et al. | 411/901 |
| 4,687,397 | 8/1987 | Berecz | 411/361 |
| 4,687,398 | 8/1987 | Berecz | 411/503 |
| 4,718,801 | 1/1988 | Berecz | 411/901 |
| 4,778,637 | 10/1988 | Adams et al. | 264/137 |
| 4,788,022 | 11/1988 | Sakayori et al. | 264/275 X |
| 4,804,427 | 2/1989 | Paul et al. | 156/180 X |
| 4,876,050 | 10/1989 | Horton | 264/258 X |

FOREIGN PATENT DOCUMENTS

63-72517  4/1988  Japan .................. 264/257

Primary Examiner—Jay H. Woo
Assistant Examiner—Robert B. Davis
Attorney, Agent, or Firm—Learman & McCulloch

[57] ABSTRACT

A method of molding fiber-reinforced bolts including wrapping a bundle of unidirectional fibers axially around a core, placing the core in a molding cavity, supplying fiber-reinforced resin to the mold cavity, and curing the resin encapsulated core. The core of the bolt product can also be made of a fiber-reinforced composite resin material.

18 Claims, 9 Drawing Sheets

FIG.14

METHOD OF TRANSFER MOLDING FIBER-REINFORCED RESIN BOLT PRODUCTS

This invention relates to parts molded from fiber reinforced resins commercially known as composites, and more particularly relate to the production of non-magnetic, high structural strength bolts and like products which are generally indetectible by radar and wherein greater strengths in torsion, tension and shear are required for specialized applications. The inventor is aware of the following prior patents:

| | | | |
|---|---|---|---|
| 243,934 | Mayall | 4,687,395 | Berecz et al |
| 2,989,784 | T. Aamodt | 4,687,397 | Berecz |
| 3,884,814 | Vogt et al | 4,718,801 | Berecz |
| 4,317,407 | Blackwell | 4,687,394 | Berecz |

BACKGROUND OF THE INVENTION

While transfer and injection molded, fiber reinforced resin parts have been produced commercially for some time, for use in a variety of industries including the aircraft industry, and provide considerable structural strength, there is a need for even stronger fastener products, such as bolts with axially elongate shanks, which may be subjected to unusually high stresses. Parts produced commercially heretofore, have incorporated chopped glass, carbon, and aramid fibers, optimally on the order of ¼ to 1 inch in length (but dependent on the nature of the part possibly from 0.010 to three inches in length), randomly dispersed in thermosetting resins such as epoxy and vinyl ester compounds, and thermoplastic resins including polymeric amides, i.e., "nylon". In such parts, the relatively short fibers (relative to the length of the part), do not, in any substantial number, assume an axial orientation in the finished product. To the best of my knowledge, there is no practical way to control the orientation of fibers in a transfer or injection molded part, where the material with entrained fibers is flowed into the mold cavity under very high pressures.

The present invention achieves the positive axial orientation of an elongate fiber bundle during the transfer molding process, and effectively bonds the fiber lengths with the resin making up the body of the product.

One of the prime objects of the present invention is to obtain a composite bolt having far greater strength in tension on the order, for example, of 3:1.

Still another object of the invention is to provide a bolt which has significantly higher strength in torsion, and in shear.

Still another object of the invention is to provide a process wherein the product is more reliably constructed, and the proportion of parts produced to standards is significantly improved.

Other objects and advantages of the invention will become apparent from the drawings I have included, and the description to follow.

SUMMARY OF THE INVENTION

The process for producing the significantly stronger part is concerned with the provision of an axially extending core, of a substantial part of the length of the part to be formed, which mounts an elongate fiber bundle in a manner to compositely provide increased strength to the part molded. The invention is concerned with the method of forming the part as well as the part which is produced by the novel method.

GENERAL DESCRIPTION

Referring now more particularly to FIGS. 1-6 of the drawings in the first instance, a mold, generally designated M, is disclosed in FIGS. 1-6 as comprised of a vertically movable lower mold part 10 and a fixed upper ring-like mold part 11, which has an opening 12 for snugly accommodating a compression plunger or ram 13. It is to be understood that transfer molding presses of the character used to raise and lower mold part 10 and ram 13, are well known in the industry and need no description here. Guide pins 14 may be provided on the mold 11, to be received by bushings 15 on the mold 10 and maintain the concentric alignment of the mold parts 10 and 11.

It is to be further understood that platen mounted mold part 10 is raised and lowered by the usual hydraulic cylinder (not shown), and that the plunger 13 is independently operated by a separate hydraulic cylinder (not shown), in the usual manner. Further, a conventional clamp mechanism (not shown) is provided for maintaining the bottom mold 10 clamped to the upper mold 11, when the molds are brought together for the molding operation.

Figure 1:
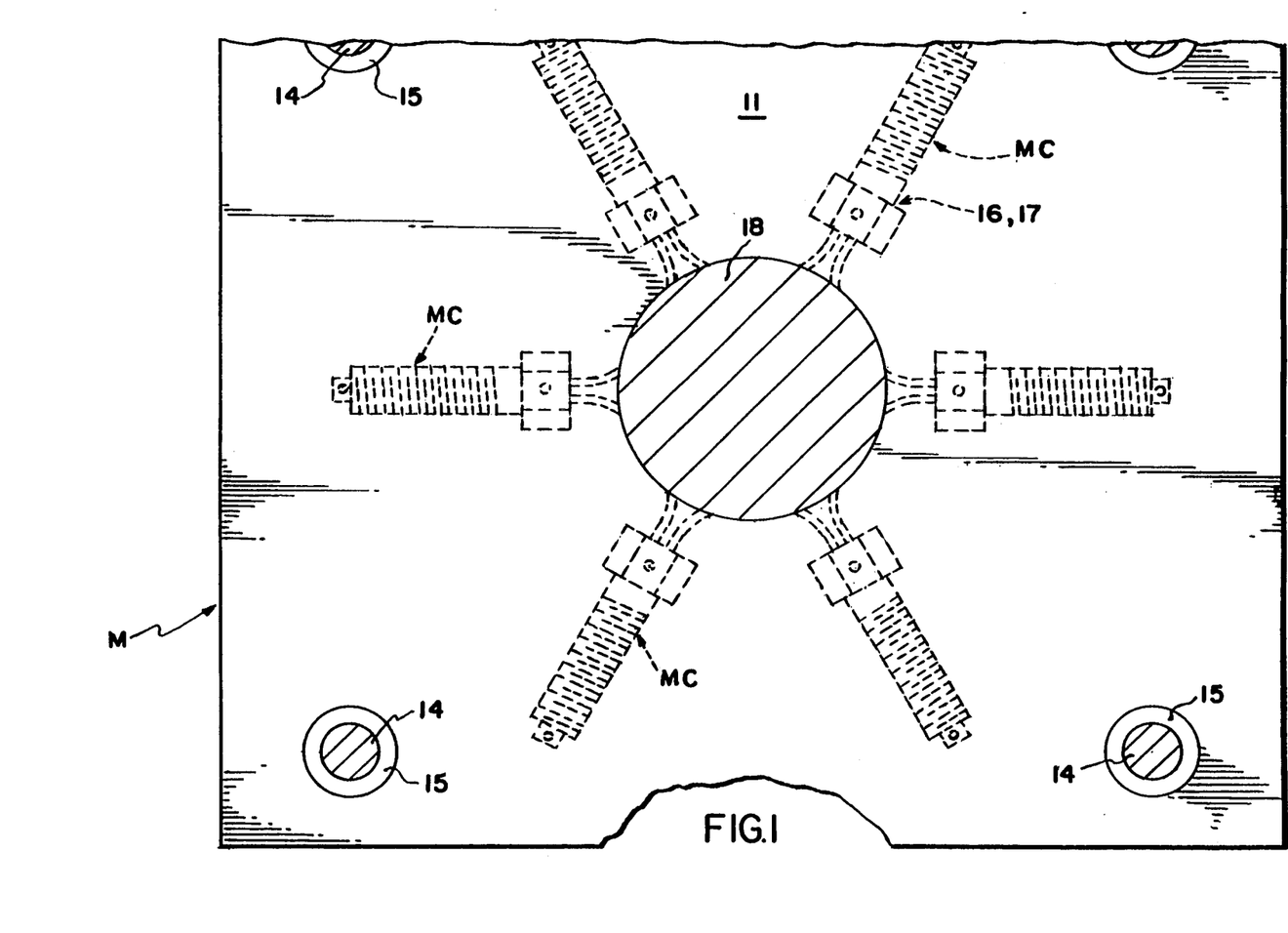
FIG. 1 is a schematic, sectional, top plan view illustrating a transfer molding mold.
Figure 2:
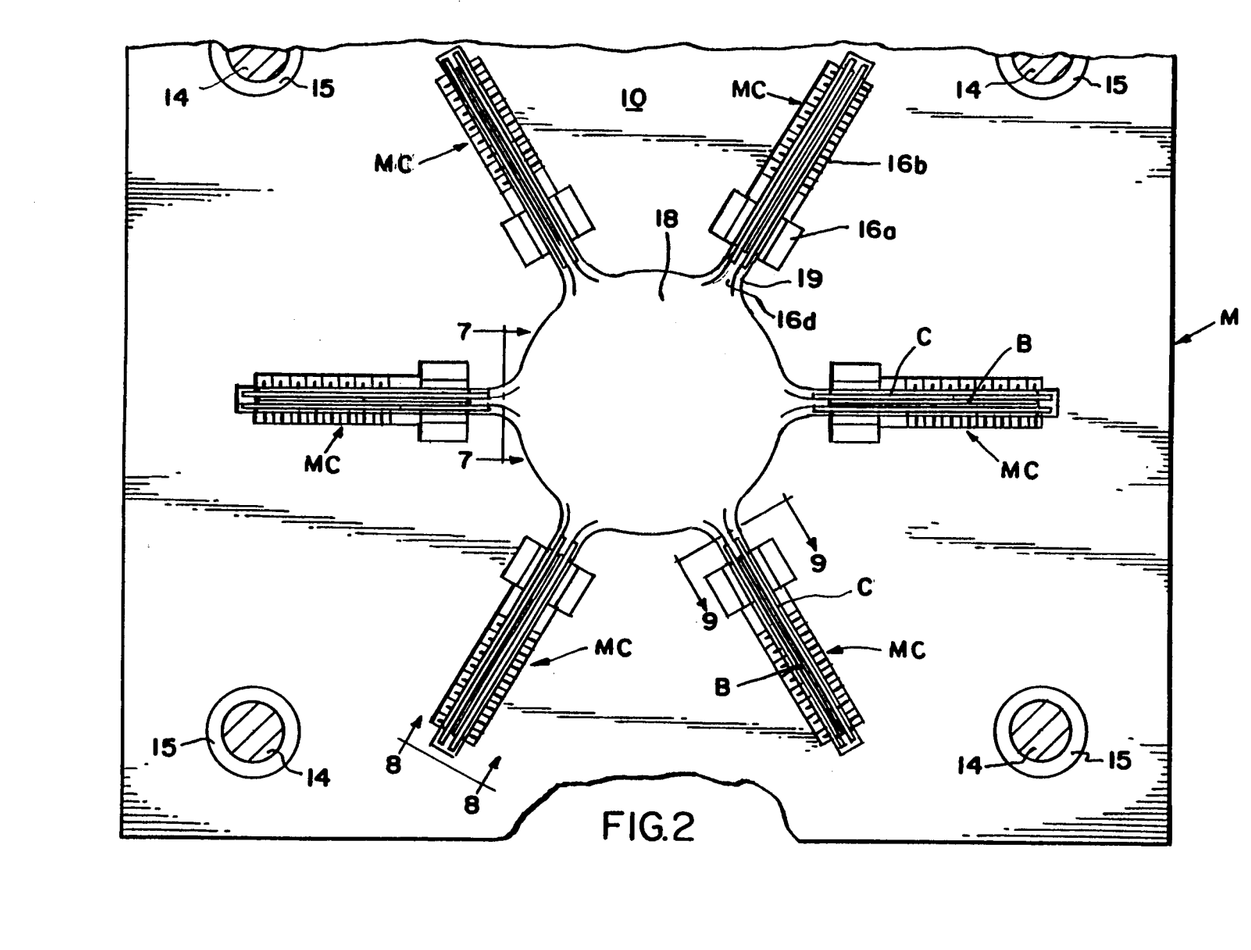
FIG. 2 is a similar top plan view of the lower half of the transfer mold only, with the fiber glass bundle carrying core in position to receive the deposit of the composite resin material.
Figure 4:
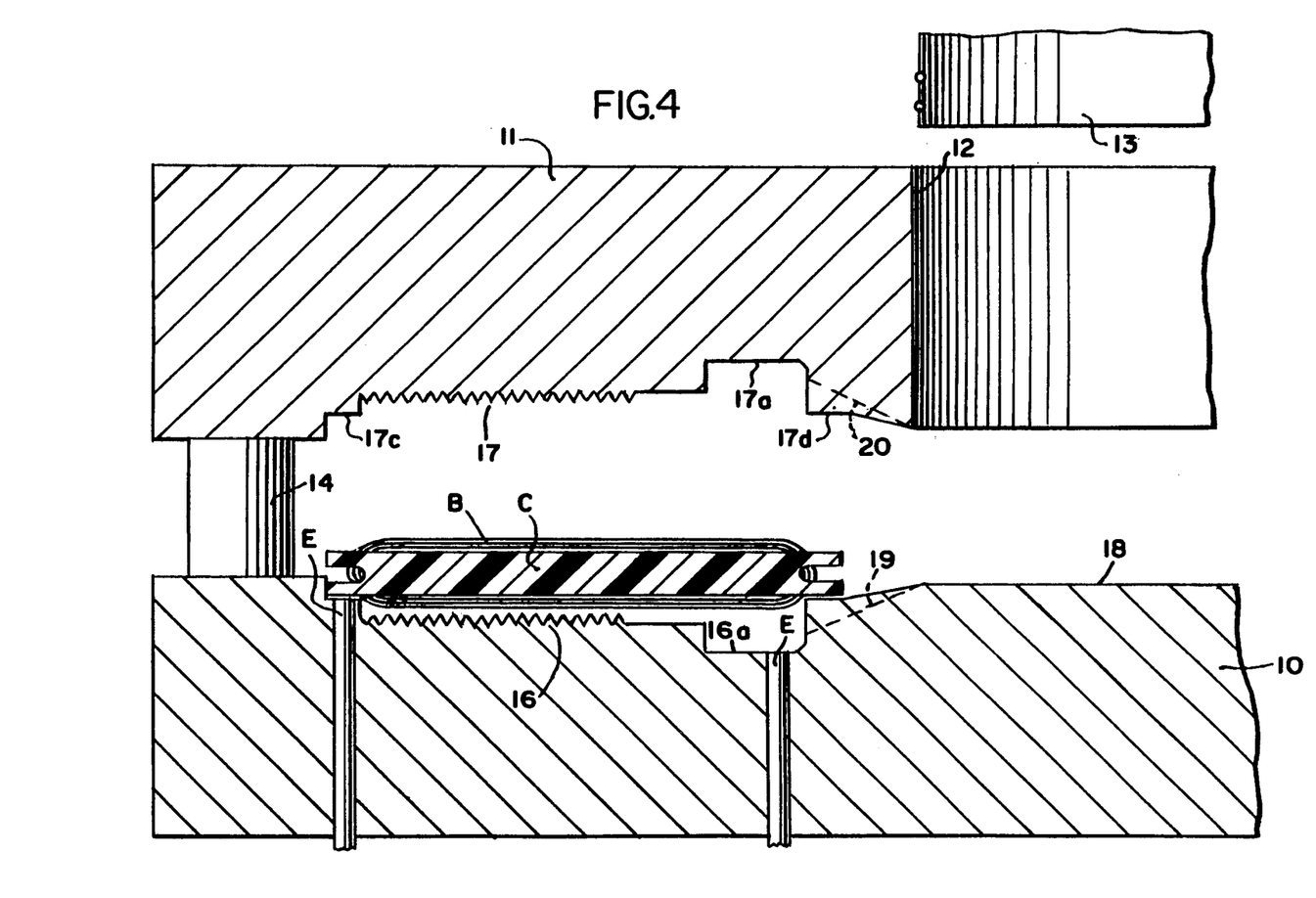
FIG. 4 is a similar view with the fiber glass bundle carrying core in position.
Figure 5:
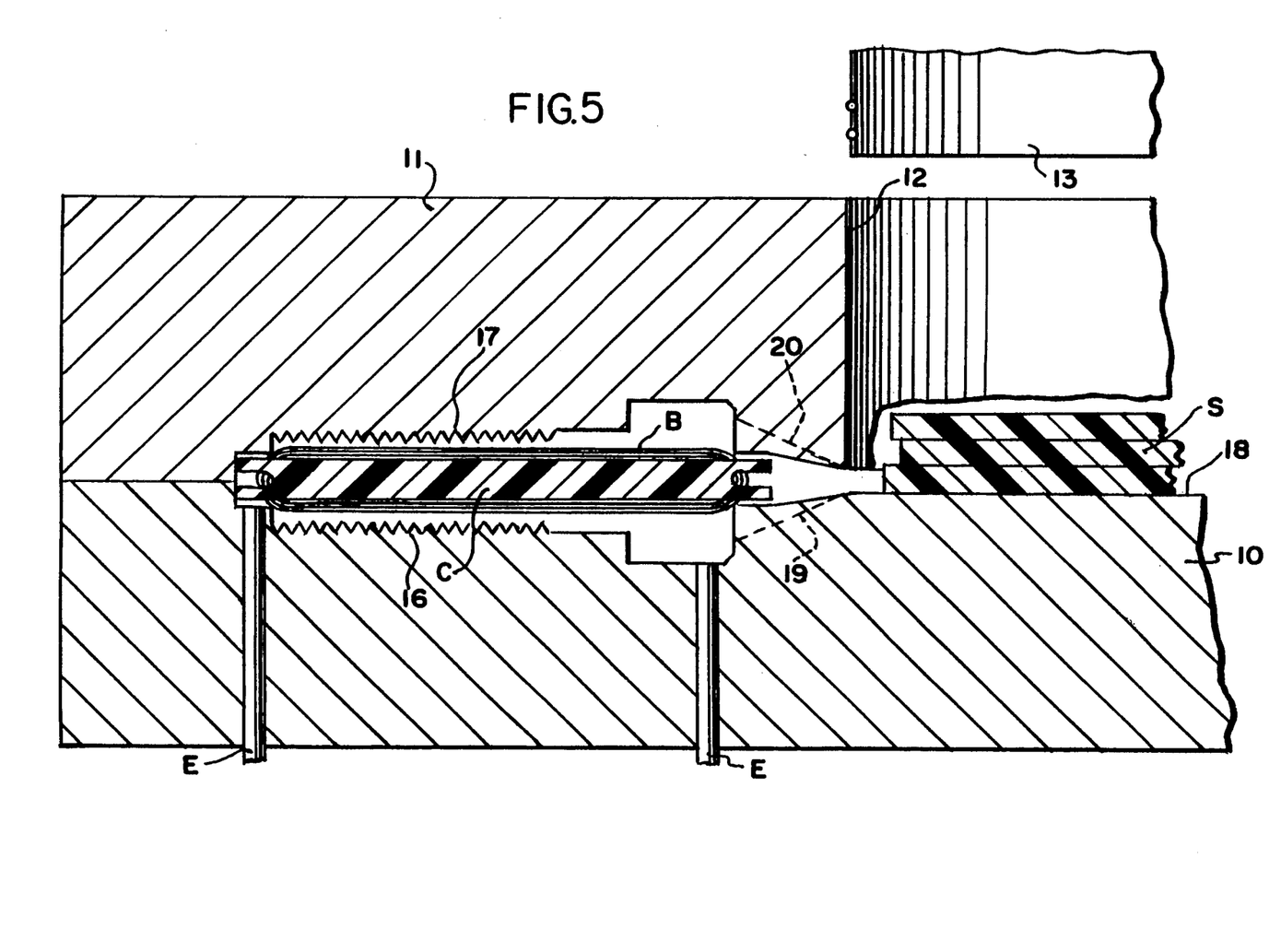
FIG. 5 is a similar view with the upper mold part moved down to molding position, and the composite material to be compacted and squeezed into the mold cavity shown in deposited position.
Figure 9:
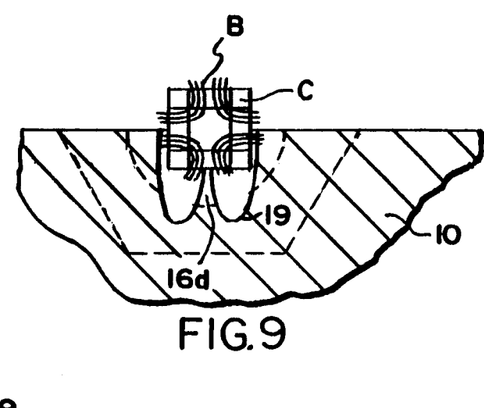
FIG. 9 is an enlarged, fragmentary, sectional view taken on the line 9—9 of FIG. 2.
Figure 14:
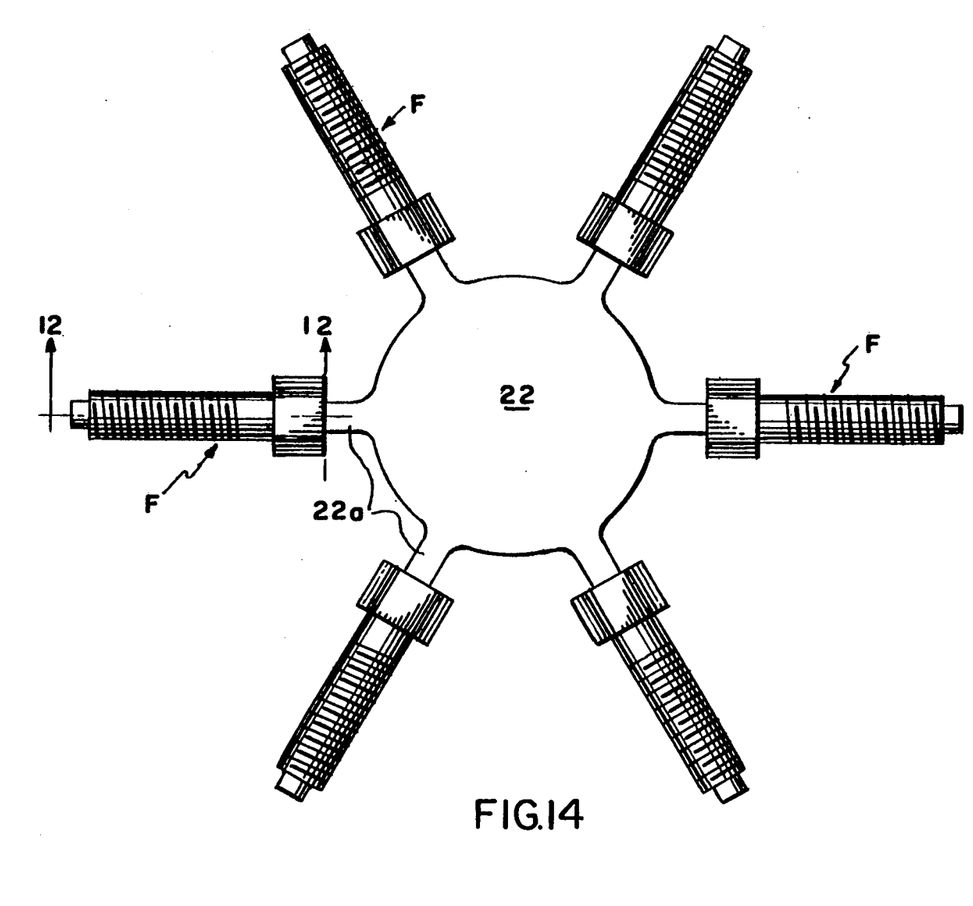
FIG. 14 is a top plan view of the multiple product body molded in the mold disclosed.

As FIGS. 1, 2 and 14 particularly make clear, a number of molded parts, which in the present instance comprise fastening bolts, generally designated F, can be molded in a single operation. To this end, a plurality of circumferentially spaced mold cavities, generally designated MC, are provided in mold M. As particularly shown in FIGS. 2-6, cavity portions 16 are provided in bottom mold 10 to mate with similar mold cavities 17, provided in the upper fixed mold 11. The mold cavities MC surround a transfer pot platform, generally designated 18, which, as illustrated in FIG. 5, is supplied with pre-prepared sheets S of the fiber reinforced composite to be molded. The transfer molding pot, formed by the surface 18 and the annular interior surface 12 of ring mold 11, when the lower mold 10 is in the raised position, is connected to each mold cavity MC by a passage means in the form of a gate 19 having a dual hemi-elliptical configuration in cross-section, as shown particularly in FIG. 9. Gates in this configuration have been found to better control and distribute the flow of material to the mold cavities MC. Identical mating gates 20 are provided in the upper mold member 11.

Figure 3:
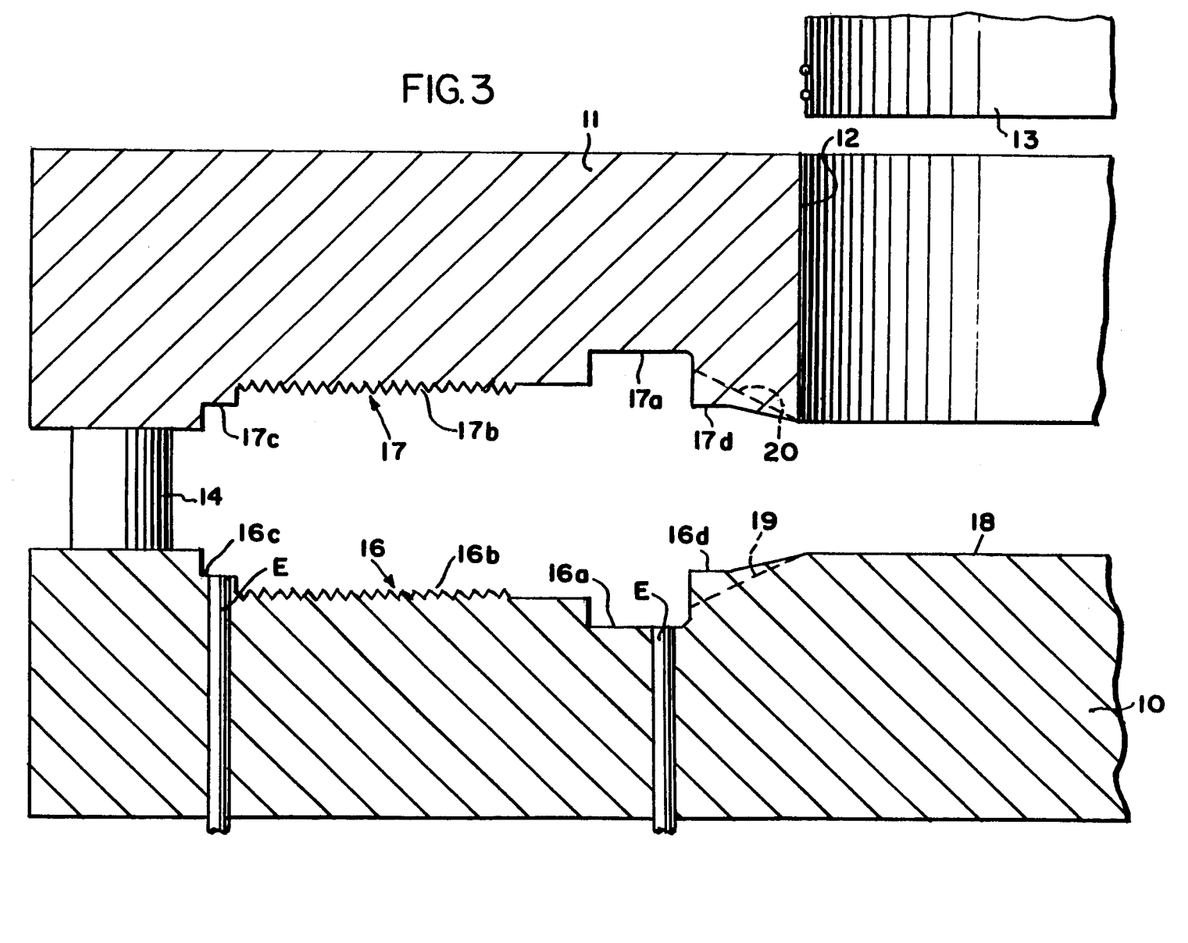
FIG. 3 is a schematic, sectional, enlarged, fragmentary, elevational view, showing both the upper mold part and compaction plunger in raised position.
Figures 10, 11:
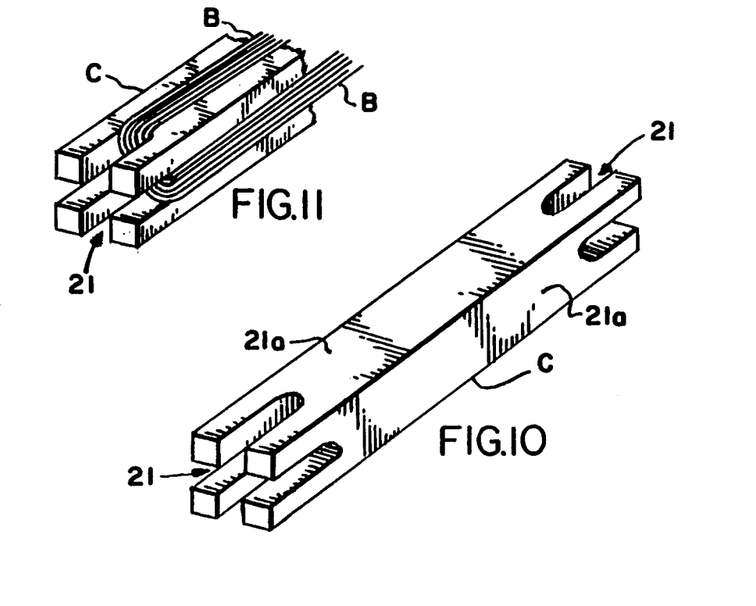
FIG. 10 is a perspective elevational view of the core body which is employed.
FIG. 11 is a similar fragmentary view, illustrating the manner in which a bundle of fiber glass strands is wound around the cruciformly notched ends of the core.

As illustrated in FIG. 3, each of the mold cavities 16 and 17 provide cavity portions 16a and 17a for molding a bolt head, and cavity portions 16b and 17b for molding an integrated, axially elongate, threaded bolt shank or stem. At their ends, the cavities 16 and 17, formed in the mold parts 10 and 11, provide seats 16c and 17c at one end, and 16d and 17d at the other end, for the purpose of supporting a carrier rod or core C in radially spaced relation from the surrounding walls of cavities MC, as shown in FIG. 4. The form taken by the core, generally designated C, is particularly disclosed in FIGS. 10 and 11. As FIG. 10 indicates, the core C is a preferably, but not necessarily, composite (resin-fiber) bar having ends which are cruciformly notched as at 21. The bar is, in the embodiment shown, square in cross-section to provide axially extending faces 21a which extend substantially the full length of the portions 16a, 17a, and 16b, 17b of the mold cavities 16 and 17.

Mounted on the core C is a single pre-prepared, resin-coated bundle B of elongate fibers formed, for example, of strengthening fiber material such as glass, aramid, or carbon, which is wound on the core in a manner to dispose axially parallel lengths in axial disposition along the faces 21a of the core. The fibers in each bundle may comprise a number of thousands of individual fibers, in typical fiber diameters such as 0.0003 to 0.0007 diameter. The fibers are the same as those used to reinforce commercial composites in the present day marketplace, but are considerably longer and each extends substantially the full length of the bundle B. The fibers are of non-tubular, imperforate cross-section, to provide the strength which is necessary, and, typically, will provide 200 to 300 yards of strand per pound of glass material, for example. The bundle B, which is formed of a plurality of unidirectional fibers, is coated with a partially cured coating of the same resin (without fibers) which is used (with fibers) to form the core-surrounding body of the bolt. The resin is present in the bundle B in a ratio of about 60 to 80 percent fiber (glass) to resin by weight.

It is to be understood that the resin provided in stacked sheet form S, as shown in FIG. 5, may comprise a reinforced sheet molding compound, which consists of, for example, epoxy or vinyl ester resin, mixed with a suitable hardening catalyst, commercially referred to as a hardener, in proper proportion such as, for example, 4:1 in terms of the resin to hardener. If the vinyl ester is used, it may be peroxide-cured in the usual manner and, if the resin is an epoxy, it may be anhydride-cured as, for example, described in U.S. Pat. No. 4,017,453. Randomly dispersed in the resin sheet material S, are the same glass, aramid, or carbon fibers, optimally in the proportion of 60 to 80 percent fiber to resin by weight. In some parts to be molded, where the same strength is not required, the sheet fibers may be omitted, and in others the ratio might reach 90% fiber to resin by weight. The fibers optimally will be in the length $\frac{1}{4}$ to one inch in length, but, conceivably, could be 0.010 to three inches in length dependent on the size and other specifications of the part to be molded. The sheet molding compound S, as well as the same coating applied to bundle B, is in a partially cured state in which the polyester resin is in a soft, somewhat adhesive condition. The material in this state has been mixed with a hardener and permitted to achieve a certain degree of curing, after which it is subjected to temperatures which maintain it in its partially cured state. This procedure is well described in U.S. Pat. No. 4,017,453 which speaks of a first stage cure which produces a gelled intermediate wherein the partial cure is not such that it would interfere with the resin flow required in the second stage fabrication. This is the partial cure to which reference is made herein for the resin coating bundle B, and, also, for the fiber reinforced material S. Other patents describing composite formulations are U.S. Pat. Nos. 3,997,499; 4,056,506; 4,097,448; 4,097,449; and 4,167,539. When the bundle B is wound around the core, in a manner to be accommodated by the cruciform notches, the partially cured coated material is sufficiently tacky or adhesive that the ends of the bundle will adhere to other portions of the bundle when pressed against it In this way, as FIGS. 2, 5, and 6 particularly illustrate, the single length bundle is wrapped lengthwisely on the core or carrier C, with a portion of the length of each bundle extending axially along each face 21a of the core C.

DESCRIPTION OF THE PROCESS OPERATION

Figure 6:
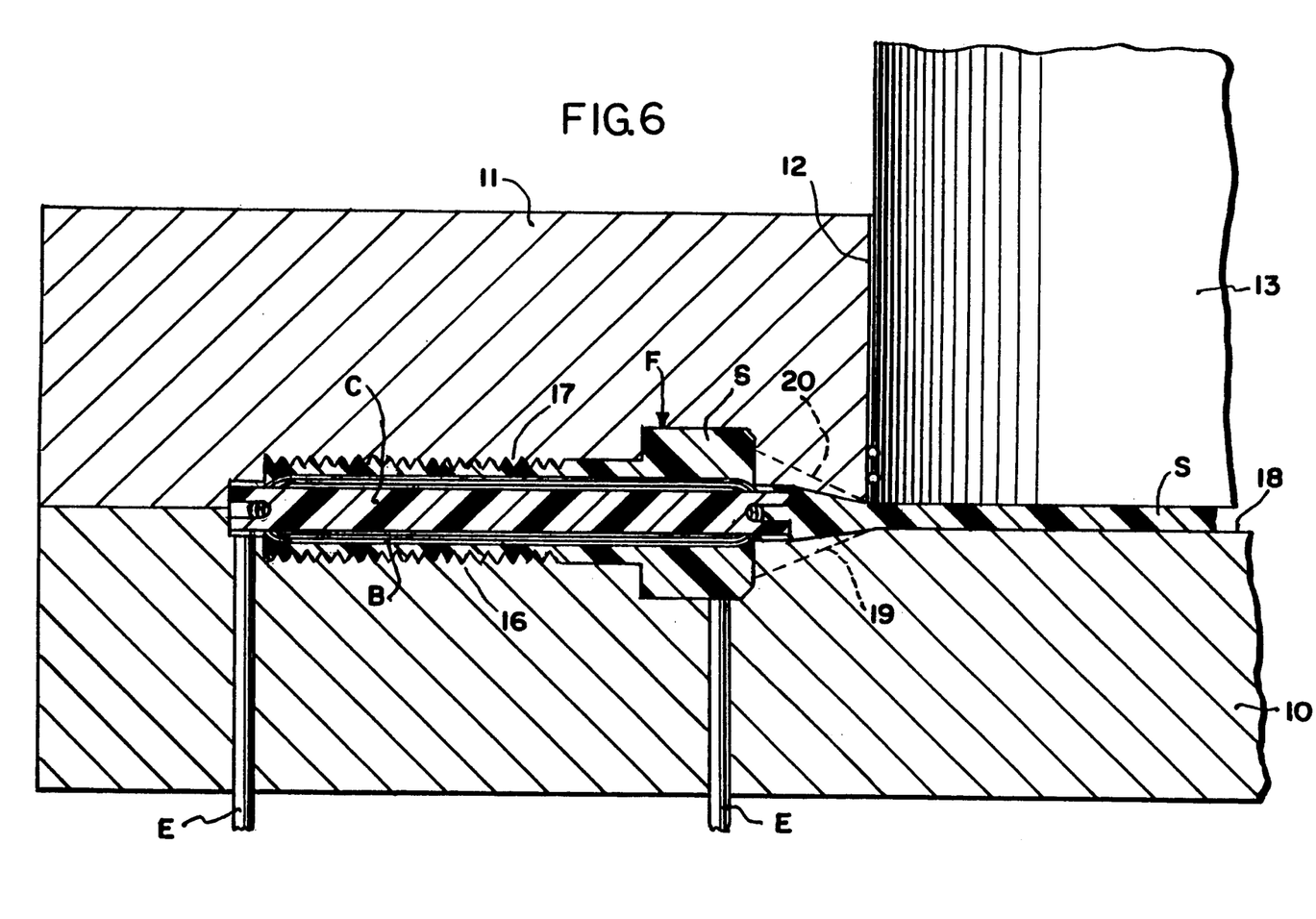
FIG. 6 is a similar view in which the compacting plunger has been moved down to force the material into the mold cavities.
Figure 7:
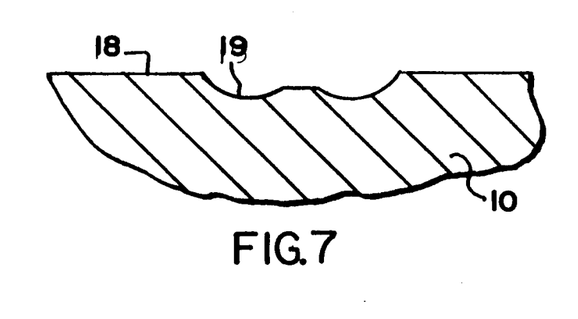
FIG. 7 is an enlarged, fragmentary, sectional view taken on the line 7—7 of FIG. 2.
Figure 8:
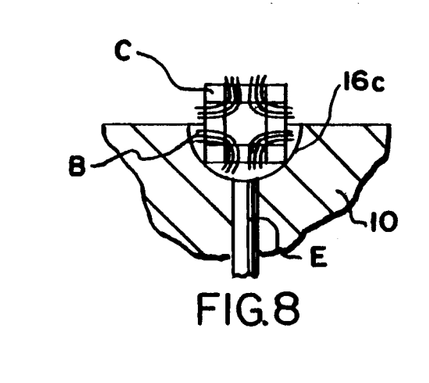
FIG. 8 is an enlarged, fragmentary, sectional view taken on the line 8—8 of FIG. 2.

FIG. 3 illustrates the separated position of the mold parts, in which the mold part 10 is in lowered position, and the compressing ram 13 is in raised position. In FIGS. 2 and 4, a core C has been loaded to the cavity half 16 shown. In FIG. 5, the mold 10 has been raised to the level of the mold 11, and the partially cured sheets of molding compound S have been loaded to the platform 18. In FIG. 6, the compression ram 13 has been pushed downwardly to reduce the heated sheet material S to a flowable plastic state, and force it into the cavities MC under compression forces in the neighborhood of 700 to 2000 p.s.i. Thereafter, the plunger 13 is maintained in the lowered position, until such time as the molded part fully hardens or cures, which may typically be in a time period in the neighborhood of one to five minutes.

Prior to being loaded to the platform 18, the sheet compounds S have been heated to temperatures in the neighborhood of 120° to 200° F. During the pressure molding step, the temperature of the material S increases to a point where the material is flowable, because of the heat applied to the compression plunger 13 and mold parts, and the pressure forces applied to the material. Typically, the molds 10 and 11 are heated in the conventional manner to temperatures in the range of 250° to 325° F. which are the final stage, material curing temperatures.

Because the fiber bundle coating is in a partially cured state during the molding operation, it will very effectively bond to the similarly partially cured composite material which encapsulates the entire core, as the molded part cures. When the mold 10 is lowered, after the hardening or curing of the part, ejector pins, generally designated E, support the molded part as the mold 10 is lowered, to strip the part out of the mold cavities in the usual manner. The part which is removed from the mold is shown in FIG. 14 as comprising a plurality of bolts F, connected by gate-formed portions 22a to a cull, generally designated 22. The individual bolts F are then severed from the bifurcated protruding core end portions at each end.

Figure 12:
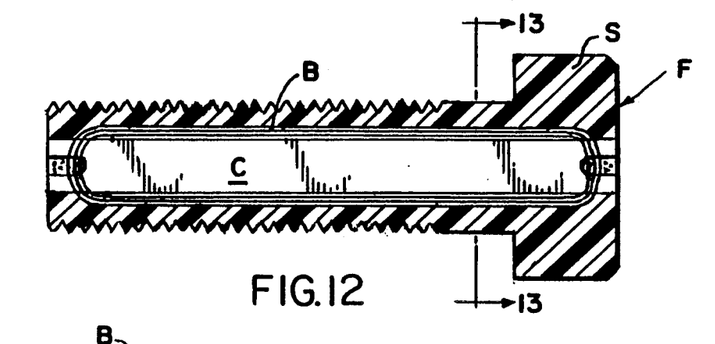
FIG. 12 is an enlarged, sectional plan view of the product which is molded, taken on the line 12—12 of FIG. 14.
Figure 13:
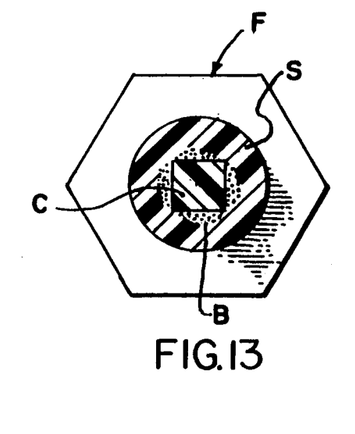
FIG. 13 is a sectional view through one of the bolts which is molded, taken on the line 13—13 of FIG. 12.

The completed bolt F is illustrated in FIGS. 12 and 13. Each bolt has a core C with axially extending faces 21a along which portions of a fiber bundle B extend. The core and unidirectional bundle lengths are bonded in the composite resin.

During the severing operation separating bolts F, the protruding ends of the core, formed by the notched sections, are trimmed off, and what preferably remains are the portions of the bundle which wrap around the ends of core C and the axially extending lengths of bundle B lying along each face of the core. However, because the fibers on the core become an integrated portion of the homogenous mass during the curing step, the portions which wrap around the ends may be severed during the bolt severing operation without serious effect. In this case, the axial lengths making up the bundle B are separated one from the other. A bolt molded in a transfer molding, or an injection molding, operation according to the method claimed is useful in a variety of industries in which high strength, non-conductive, non-magnetic bolts are required.

This disclosure is representative of preferred embodiments of the invention, but is intended to be illustrative rather than definitive thereof. The invention is defined in the claims.

What is claimed is:

1. A method of molding high strength, fiber-reinforced, structural composites having axially elongated shanks including fiber-reinforced bolts requiring substantial strength in torsion, tension and shear, comprising the steps of:
   a. providing a partible mold having an axially extending molding cavity shaped to mold an end portion with an axially extending shank portion and axially disposing an axially extending core, mounting an elongate bundle of elongate reinforcing fibers extending in an axial direction along an exposed face of the core substantially from one end of the core to the other, in said molding cavity;
   b. supplying a fiber-reinforced resin in a flowable state to said mold cavity in a manner to perimetrally encapsulate said core substantially from end to end thereof and fill the mold cavity;
   c. hardening the resin encapsulating said core with the bundle of fibers extending in an axial direction along the core and thereby resin-bonding the core, bundle of fibers, and the fiber-reinforced encapsulating resin to integrate them as a structural element; and
   d. removing the composite product formed from the mold.

2. The method of claim 1 wherein said resin supplied to the mold is a resin selected from the group consisting of thermosetting and thermoplastic resins and subjected to high pressure, densifying forces during the mold filling and resin hardening steps.

3. The method of claim 2 wherein said resin comprises a thermosetting resin selected from the group consisting of epoxy and vinyl ester resins with a hardener.

4. The method of claim 1 wherein said core has a multiplicity of opposed axially extending surfaces, and said bundle is wound endwise on said core to uniformly present a multiplicity of generally parallel, bundle lengths on said surfaces extending axially along said axial surfaces generally the axial length of the core.

5. The method of claim 4 wherein said core is notched at its ends to permit a portion of said bundle having a length extending in one axial direction along one of said axially extending surfaces of the core to be wound within the notch formed around one of said ends and then extend back along another axially extending surface of said core in an opposite direction.

6. The method of claim 5 wherein said core is square in cross-section, is cruciformly notched, and said bundle lengths are formed from a single bundle of elongate fibers coated with said resin in a non-fully cured state, and with the bundle free ends adhered to the bundle.

7. The method of claim 6 wherein said core is formed of a composite resin material prior to insertion in said cavity.

8. The method of claim 1 wherein fibers in the resin compound fed to the cavity are chopped fibers on the order substantially of 0.010 to 3 inches in length, randomly dispersed.

9. The method of claim 1 wherein said cavity is configured to the shape of a bolt having a head and an exteriorly threaded axially extending shank.

10. The method of claim 1 wherein said bundle of fibers are selected from the group consisting of glass, aramid, and carbon fibers.

11. The method of claim 1 wherein the core is polygonal in cross-section to provide a plurality of axially extending faces; is formed from a hardened resin composite of the same, or a compatibly bondable, resin material around which said encapsulate is flowed and molded, and has a portion of said bundle extending along each axial face of the core.

12. A method of molding fiber-reinforced composite resin bolts having bolt head and threaded shank portions comprising the steps of:
   a. providing a partible mold having an axially extending molding cavity shaped to mold a bolt head portion and an axially extending threaded portion and axially loading an axially extending core formed of fiber-reinforced resin and having axially parallel exposed faces, and mounting a resin-coated bundle of reinforcing fibers extending in lengths in an axial direction along the said exposed faces of the core, in said molding cavity;
   b. Supplying a fiber-reinforced resin in a partially cured flowable state to said mold cavity in a manner to perimetrally encapsulate said core and fill the mold cavity completely around the core to form a bolt head and a threaded bolt shank around said core; and
   c. curing the resin encapsulating said core with the bundle of fibers extending in an axial direction along the core and thereby resin-bonding the core, fibers and encapsulating resin to integrate them as a structural element.

13. The method of claim 12 wherein said bundle of fibers is made up of individual fibers of generally the length of said bundle with the fibers being substantially present in the range of 60–80% fibers to resin coat by weight.

14. The method of claim 13 wherein relatively shorter reinforcing fibers, randomly interspersed in the resin compound, comprise chopped fibers on the order of substantially ¼ to 1 inch in length present generally in the quantity of up to 90% fibers to resin by weight.

15. The method of claim 12 wherein said core is notched at its ends and said bundle is wound thereon to permit a portion of said bundle having a length extending in one axial direction along one of said axially extending surfaces of the core to be wound within the notch formed around one of said ends and then extend back along another axially extending surface of said core in an opposite direction, the mold having core and receiving portions communicating with the ends of the mold cavity, for snugly receiving said notched ends and supporting the core in a position in which it is circumferentially spaced from the marginal walls of the mold cavity.

16. The method of claim 12 wherein said fibers are solid, non-tubular fibers.

17. The method of claim 12 wherein said bundle is coated with a resin in a partially cured state at the time the core is loaded to said cavity with the fibers being substantially present in the range of 60–80% fibers to resin coat by weight.

18. A method of fabricating a fiber-reinforced composite resin bolt having a bolt head and an elongate axially extending threaded shank which does not require machining of the threads, comprising the steps of:

a. providing a partible mold having a molding cavity shaped to mold a bolt head with a threaded shank portion extending axially from the bolt head, with the cavity having shoulders at its ends for supporting a core;

b. axially loading an axially extending core formed of a cured resin with randomly dispersed chopped fibers on the order of substantially ¼ to 1 inches in length and in the quantity of substantially 60% to 80% fibers to resin by weight to the cavity shoulders, the core being notched at each of its ends and having uni-directional, solid, non-tubular, reinforcing fibers wound through said notches to provide a bundle of fiber lengths extending axially along each planar face of said core, each bundle being coated with a resin in a partially cured state, with the fibers being present in the coated state in the range of substantially 60% to 80% fibers to resin coat by weight;

c. supplying a fiber-reinforced polyester resin in a partially cured flowable state to the mold cavity under pressure in a manner to perimetrally encapsulate the core and fill the mold cavity completely around the core to form a bolt head and a threaded bolt shank around the core;

d. curing the resin coating said fibers and the resin encapsulating said core to bond the core, bundle of fibers and encapsulating resin in an integrated body;

e. removing said cured hardened bolt from the mold cavity and trimming protruding portions of the notched ends of said core from the bolt formed.

* * * * *